Nov. 27, 1934.   S. R. LARGE   1,982,347
CAGE OR SEPARATOR FOR BEARINGS
Filed Dec. 29, 1932

INVENTOR:
SAMUEL R. LARGE,
BY Gales P. Moore
HIS ATTORNEY.

Patented Nov. 27, 1934

1,982,347

UNITED STATES PATENT OFFICE 1,982,347

CAGE OR SEPARATOR FOR BEARINGS

Samuel R. Large, Bristol, Conn., assignor, by mesne assignments, to General Motors Corporation, Detroit, Mich., a corporation of Delaware Application December 29, 1932, Serial No. 649,367

8 Claims. (Cl. 308—201)

This invention relates to cages or separators for bearings and comprises all of the features of novelty herein disclosed. An object of the invention is to provide an improved separator for spacing and guiding antifriction rolling elements. Another object is to provide a simple, reliable and inexpensive separator capable of easy assembly with its rolling elements. Another object is to provide improved means for retaining antifriction rolling elements in a cage and permitting snap assembly.

To these ends and also to improve generally upon devices of this character, the invention consists in the various matters hereinafter described and claimed. In its broader aspects, the invention is not necessarily limited to the specific structures selected for illustrative purposes in the accompanying drawing in which Fig. 1 is a sectional view of a portion of a ball bearing having one form of cage or separator.

Figure 1:
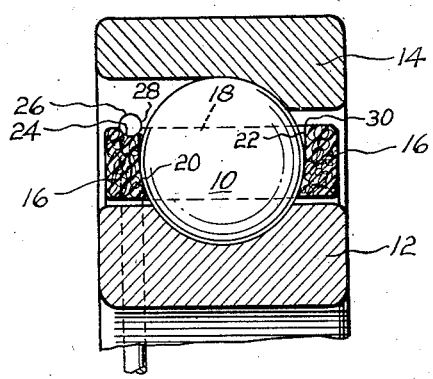

The numeral 10 indicates one of a circular series of antifriction rolling elements, preferably balls running between a grooved inner race ring 12 and a grooved outer race ring 14. The bearing is shown as of the open or separable type wherein the outer race ring can be assembled by axial movement over the row of balls. The cage comprises a sleeve-like body having openings or pockets for the balls and is preferably composed of molded bakelite or fibrous material impregnated with bakelite. The openings provide surfaces surrounding the balls and confining them laterally. The body comprises opposite side walls 16 connected by partitions 18 and each pocket preferably has one portion or half spherical as indicated at 20 to conform to the ball and retain it radially of the bearing while the rest of the pocket has a substantially cylindrical surface 22 tangent to the spherical surface to provide an entrance opening of about the size of the ball. One side wall 16 is provided with a continuous peripheral groove 24 extending around it and breaking through or intersecting each pocket at one side thereof. The groove receives a C-wire or split ring 26 which grips the groove by spring pressure. The split ring 26 overhangs the series of pockets and the rolling elements to a slight degree so that the distance from the overhanging side 28 of the ring to the opposite point 30 of each pocket is narrowed to a little less than ball diameter. Thus the balls can be popped or snapped into the pockets upon application of pressure radially and are retained against escape. The ring gives laterally but not enough to crowd it out of the groove. The side wall of the ring is rounded or convex so that the balls are not scratched or marred. The ring has a continuous supported engagement peripherally with the body at the groove.

Figure 2:
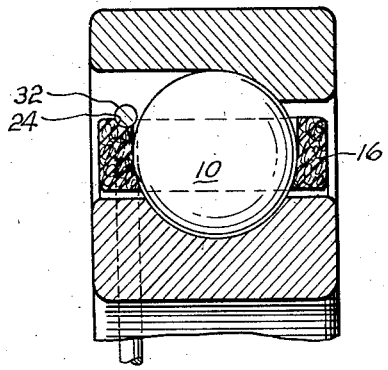
Figs. 2, 3 and 4 are similar views with slightly different cages.

In Fig. 2, the construction is similar but the ring 32 is a continuous ring which is expanded, as by heat or pressure, to get it into the groove 24.

Figure 3:
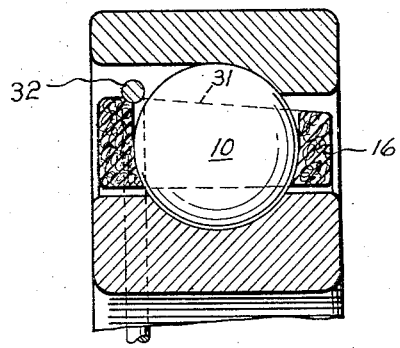

In Fig. 3, the outer surface of the ring body is conical or tapered as indicated at 31 and the ring 32 is forced up the surface gradually to its groove.

Figure 4:
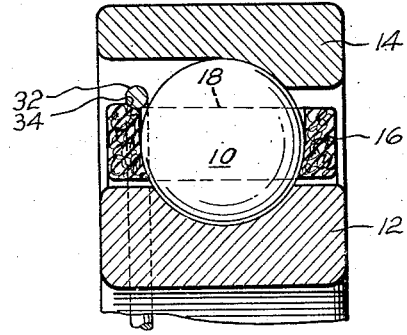
Figure 5:
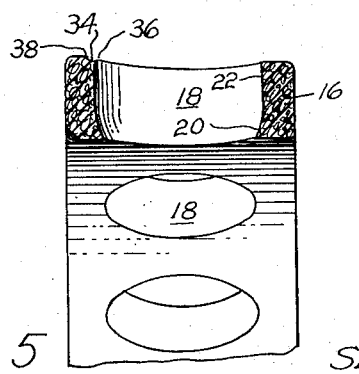
Fig. 5 is a sectional view of a portion of a cage body.

In Figs. 4 and 5, the ring body has a small taper of about one degree and meets the adjacent side of the groove 34 at a low rib 36 which is considerably lower than the opposite side wall 38 of the groove. Thus the ring requires little stretching in assembly and will contract firmly into the bottom of its groove, the balls insuring ring retention and the ring retaining the balls.

I claim:

1. In a separator, a body having a series of pockets, rolling elements in the pockets, the pockets in the body having surfaces surrounding and enclosing the rolling elements with entrance openings of a size substantially the same as a corresponding dimension of the rolling elements, and a ring carried by the body and located near the sides of the entrance openings to narrow such openings to a size slightly smaller than said dimension of the rolling elements to provide for snap assembly of the rolling elements in the pockets and the ring having continuous supported engagement with the body; substantially as described.

2. In a separator, a sleeve body having a series of pockets, rolling elements in the pockets, the pockets in the body having surfaces surrounding the rolling elements to hold them laterally, the pockets also being shaped to retain the rolling elements in one direction radially of the body and being radially open in the opposite direction, and a retaining ring for narrowing the radially open portions of the pockets to hold the rolling elements therein, the ring having a rounded side wall and being yieldable to provide for snap assembly of the rolling elements; substantially as described.

3. In a separator, a sleeve body having opposite side walls and connecting partitions forming a series of openings, rolling elements in the openings, and a ring carried by the body and overhanging all of the rolling elements to retain them in the openings and the ring having a continuous supported engagement with the body; substantially as described.

4. In a separator, a sleeve body having side walls and connecting partitions forming a series of openings, rolling elements in the openings, a retaining ring carried by the body and having a rounded side wall arranged at a distance slightly less than the corresponding dimension of the rolling elements from one side of all the openings to provide for snapping the rolling elements into the openings past the ring and the ring having a continuous supported engagement with the body; substantially as described.

5. In a separator, a sleeve body having side walls and connecting partitions forming a series of openings, one of the side walls having a peripheral groove therein which intersects one side of each opening, rolling elements in the openings, and a retaining ring in the groove and overhanging the adjacent portions of the rolling elements to retain them in the openings; substantially as described.

6. In a separator, a sleeve body having side walls and connecting partitions forming a series of openings, one of the side walls having a continuous peripheral groove therein which intersects one side of all openings, rolling elements in the openings, and a retaining ring in the groove and having one side wall arranged at a distance slightly less than the corresponding dimension of the rolling elements from the opposite sides of the openings to provide for snap assembly of the rolling elements; substantially as described.

7. In a separator, a sleeve body having side walls and connecting partitions forming a series of openings, one of the side walls having a peripheral groove therein with a low rib on the side next to the openings, the body tapering away from the rib, rolling elements in the openings, a retaining ring in the groove, one side of the ring overhanging the openings to hold the rolling elements in the openings, and the rolling elements insuring the retention of the ring; substantially as described.

8. In a separator, a sleeve body having side walls and connecting partitions forming a series of pockets, balls in the pockets, one portion of each pocket having a spherical surface conforming to a ball and holding it from escape in one direction, the remainder of each pocket having a substantially cylindrical surface with a diameter substantially that of the balls, and a retaining ring having a rounded side wall overhanging the series of pockets near one side thereof to hold the balls from escape in another direction and the ring having continuous supported engagement with the body; substantially as described.

SAMUEL R. LARGE.